United States Patent
Frank et al.

(10) Patent No.: US 8,434,520 B2
(45) Date of Patent: May 7, 2013

(54) VALVE CONTROL UNIT, PARTICULARLY PILOT CONTROL UNIT FOR A PRESSURE MODULATOR OF A COMMERCIAL VEHICLE

(75) Inventors: Dieter Frank, Hannover (DE); Siegfried Höfler, Hannover (DE); Andreas Teichmann, Isernhagen (DE)

(73) Assignee: WABCO GmbH, Hannover (DE)

( * ) Notice: Subject to any disclaimer, the term of this patent is extended or adjusted under 35 U.S.C. 154(b) by 636 days.

(21) Appl. No.: 12/310,947

(22) PCT Filed: Sep. 6, 2007

(86) PCT No.: PCT/EP2007/007761
§ 371 (c)(1),
(2), (4) Date: Mar. 13, 2009

(87) PCT Pub. No.: WO2008/034525
PCT Pub. Date: Mar. 27, 2008

(65) Prior Publication Data
US 2010/0038571 A1 Feb. 18, 2010

(30) Foreign Application Priority Data
Sep. 20, 2006 (DE) .......................... 10 2006 044 764

(51) Int. Cl.
*F16K 31/08* (2006.01)
*F16K 1/32* (2006.01)
*B60T 8/36* (2006.01)

(52) U.S. Cl.
USPC ................. 137/884; 137/315.03; 137/315.11; 251/129.15; 303/119.3

(58) Field of Classification Search .................. 137/884, 137/315.11, 15.01, 315.03; 251/129.15; 303/119.3; 335/278
See application file for complete search history.

(56) References Cited

U.S. PATENT DOCUMENTS

| | | | |
|---|---|---|---|
| 5,941,282 A | | 8/1999 | Suzuki et al. |
| 5,975,654 A | * | 11/1999 | Zaviska et al. .............. 303/119.2 |
| 6,030,318 A | * | 2/2000 | Howard .............................. 482/4 |
| 6,453,936 B1 | * | 9/2002 | Frank et al. .............. 137/315.03 |
| 6,467,854 B2 | | 10/2002 | Frank et al. |
| 6,634,723 B1 | * | 10/2003 | Ganzel et al. .............. 303/119.3 |
| 6,817,247 B1 | * | 11/2004 | Hilberer .......................... 73/714 |

(Continued)

FOREIGN PATENT DOCUMENTS

| | | |
|---|---|---|
| DE | 197 47 142 C2 | 5/1998 |
| DE | 19918070 A1 * | 12/1999 |
| DE | 100 09 116 A1 | 8/2001 |
| DE | 103 10 083 B4 | 3/2004 |
| DE | 103 54 189 A1 | 11/2004 |

(Continued)

*Primary Examiner* — Craig Schneider
*Assistant Examiner* — Atif Chaudry
(74) *Attorney, Agent, or Firm* — Kramer Levin Naftalis & Frankel LLP

(57) ABSTRACT

A valve control unit, particularly for a pressure modulator of a commercial vehicle includes a valve control housing, solenoid valves, which are provided with solenoids and internal valve pieces inserted into the solenoids, and a pneumatic interface. The solenoids are accommodated inside the valve control housing. Pressure sensors for measuring pneumatic pressures are accommodated in or on the valve control unit, preferably on the top surface. Valve bores, into which the internal valve pieces are inserted, extend within the valve control housing. Air ducts extend between the pneumatic interface, the valve bores, and the pressure sensors, inside the valve control housing. The solenoids and pressure sensors are contacted with an electrical interface. The valve control housing can be a single piece.

21 Claims, 3 Drawing Sheets

U.S. PATENT DOCUMENTS

| | | | |
|---|---|---|---|
| 7,204,566 B2 * | 4/2007 | Otomo et al. | 303/119.3 |
| 7,905,557 B2 * | 3/2011 | Frank et al. | 303/118.1 |
| 2005/0194052 A1 | 9/2005 | Gandrud | |
| 2006/0032537 A1 | 2/2006 | Kalble | |
| 2007/0017715 A1 * | 1/2007 | McCann | 180/24.02 |
| 2007/0236084 A1 | 10/2007 | Frank et al. | |

FOREIGN PATENT DOCUMENTS

| | | |
|---|---|---|
| DE | 10 2004 035 763 A1 | 3/2006 |
| EP | 1 127 764 A2 | 8/2001 |
| WO | WO 2006007970 A | 1/2006 |
| WO | WO 2006007970 A1 * | 1/2006 |

* cited by examiner

VALVE CONTROL UNIT, PARTICULARLY PILOT CONTROL UNIT FOR A PRESSURE MODULATOR OF A COMMERCIAL VEHICLE

FIELD OF THE INVENTION

The present invention generally relates to a valve control unit, especially, a pilot control unit for a pressure modulator of a commercial vehicle.

BACKGROUND OF THE INVENTION

By means of its solenoid valves, a pilot control unit activates an air-flow-boosting relay valve, which, in turn, can activate one or more ducts. For use in an electropneumatic brake system, such as, for example, an electronically regulated brake system (EBS) for trailers, wheel-brake modules having brake cylinders for the wheel brakes are activated by the relay valve.

DE 100 09 116 A1 describes a pilot control unit for a brake pressure modulator in a trailer having an electronic brake system. The solenoid valves are constructed as cartridge solenoid valves, whose valve cartridges are placed in a housing having a solenoid. First, this solenoid is introduced into the housing, and, then, the valve cartridge is inserted in an assembly direction into the housing and joined to the housing. The pilot control unit is provided with a pneumatic and an electrical interface.

DE 10 2004 035 763 A1 describes a valve control device that is preferably provided as a valve control unit for two brake ducts of an electro-pneumatic brake system. It has three valve units, each of which is designed as a valve modulator device for a brake pressure regulating circuit; in this case, an air admission valve is provided with a primary armature and a vent valve is provided with a secondary armature, the two magnet armatures having a common armature guide arrangement and a common solenoid system and being switched at different current intensities. Thus, air can be admitted to the downstream wheel module, the input pressure can be held and venting can be achieved by means of a common solenoid system.

However, such valve control units of pilot control units generally have complex structures and require a large installation space. In particular, the manufacture of a main housing and further components as well as the pneumatic passage of air through diverse air ducts, seals and possibly tubes between the various components is time-consuming and laborious. Mounting of the solenoids and pressure sensors as well as contacting with the electronics via the separate interfaces is also time-consuming and laborious.

In the case of a defect of the sensors, valves or electronics, the entire valve control unit must then be replaced.

SUMMARY OF THE INVENTION

Generally speaking, it is an object of the present invention to provide a valve control unit, especially, for a pneumatic pressure modulator of a commercial vehicle, that is cost-effective to manufacture, has low susceptibility to malfunction, and can be installed in a small space.

In accordance with embodiments of the present invention, the valve control unit can include solenoid valves and solenoids housed in a valve control housing. Valve internals can be inserted into the valve control housing through valve bores, and air ducts can run through the valve control housing between the valve bores, a pneumatic interface, and pressure sensors. According to further embodiments of the invention, a pressure modulator is provided with such a valve control unit designed as a pilot control unit.

According to embodiments of the present invention, the solenoid valves, in what is preferably a one-piece housing or housing shell, are formed by the solenoids housed in the housing and valve cartridges introduced into the valve bores. Furthermore, the pressure sensors can be mounted on a side of the housing. Preferably, the pressure sensors (micro-structured) are placed, as sensor hybrids or hybrid chip arrangements, directly on the top side of the housing. In this case, an electrical interface, in which the solenoids are contacted and the pressure sensors are contacted, is formed on one side of the housing. Thus, the pressure sensors can be directly contacted electrically with a circuit substrate, such as a printed circuit board, and the solenoids can be contacted directly with the circuit substrate.

The valve control unit according to embodiments of the present invention is space-saving and has low susceptibility to malfunctions because the internal air supply lines are protected from mechanical damage or leaks. The electrical contacting or bonding via the electrical interface also has low susceptibility to malfunctions. The pressure sensors permit direct measurement of the pneumatic pressures without additional tube connections.

According to embodiments of the invention, the control device can be advantageously contacted with the valve control unit via an electrical interface rather than provided directly on the valve control unit. However, the control device can also be mounted directly on the circuit substrate.

Furthermore, the valve control device can have a pneumatic interface, which can be advantageously formed on one side of the housing as a labyrinth seal or as a contour for a labyrinth seal. This pneumatic interface can include ports for a connection to a plurality of lines, including, for example, a pressure reservoir and various outputs.

Thus, the valve control housing can be placed with the pneumatic interface directly abutting a relay valve and pressed against it by means of a screwed connection without the need for further substantial seals. The pressure chambers of the relay valve can be extended directly to the pressure ports of the valve control housing (i.e., the solenoid valves housed therein or to the pressure sensors).

Advantageously, the valve control housing can be constructed and arranged such that the pressure sensors and electrical interface are disposed on the top side, the pneumatic interface is disposed on the bottom (opposite) side, and the solenoid valves are oriented in horizontal direction relative thereto. Thus, air supply bores run from the pneumatic interface to the top side, just underneath the pressure sensors, and further to the bores that house the valve cartridges of the solenoid valves. These bores can be formed directly in the plastic housing, without substantial finish machining.

As an example, the solenoids can be introduced from the top side, through a recess such as a molded pocket beginning at the top side of the valve control housing. According to at least one variant, a circuit substrate, which can provide the electronic interface between the solenoids and the control device, can be introduced from above, together with already soldered solenoids. Alternatively, the solenoids can be placed into the valve control housing and then be connected or soldered to the circuit substrate, such that the circuit substrate forms the electrical interface or contains an additional plug as the electrical interface. The pressure sensors or sensor hybrids, which are also placed from above, can be connected directly with the circuit substrate, for example by being bonded thereto. The valve internals are preferably designed as valve cartridges and can be introduced in sideways direction into the solenoids; thus, manufacture and assembly can be achieved very easily in a few process steps. The valve cartridges can be used for fixing and, if necessary, also for retaining the solenoids.

The valve control housing can be manufactured relatively simply. For example, it can be an injection-molded part having molded pockets and completely formed bores or ducts. It can be equipped in a few process steps with the further components, that is, including the circuit substrate with solenoids soldered thereto, valve cartridges, and pressure sensors or sensor hybrids. Thereafter, the valve control unit can be placed directly on the relay valve and pressed sealingly against it, for example, by screwed connections.

The inventive valve control unit can be used as a pilot control unit both in an electro-pneumatic brake system, or, in other words, in an electro-pneumatic brake pressure modulator for activation of the relay valves for the downstream brake ducts, and in an electro-pneumatic level-regulating system with air bellows for level regulation or traction regulation.

Still other objects and advantages of the present invention will in part be obvious and will in part be apparent from the specification.

The present invention accordingly comprises the features of construction, combination of elements, and arrangement of parts that will be exemplified in the constructions hereinafter set forth, and the scope of the invention will be indicated in the claims.

BRIEF DESCRIPTION OF THE DRAWINGS

For a fuller understanding of the inventive embodiments, reference is had to the following description taken in connection with the accompanying drawings in which.

DETAILED DESCRIPTION OF PREFERRED EMBODIMENTS

Figure 1:
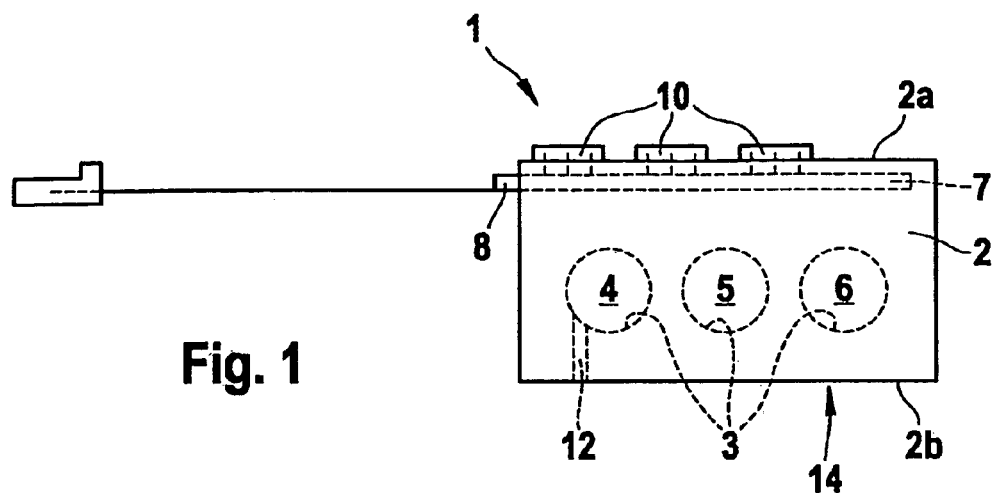
FIG. 1 is a side view of an inventive valve control unit as a pilot control unit with connecting cable and plug.
Figure 2:
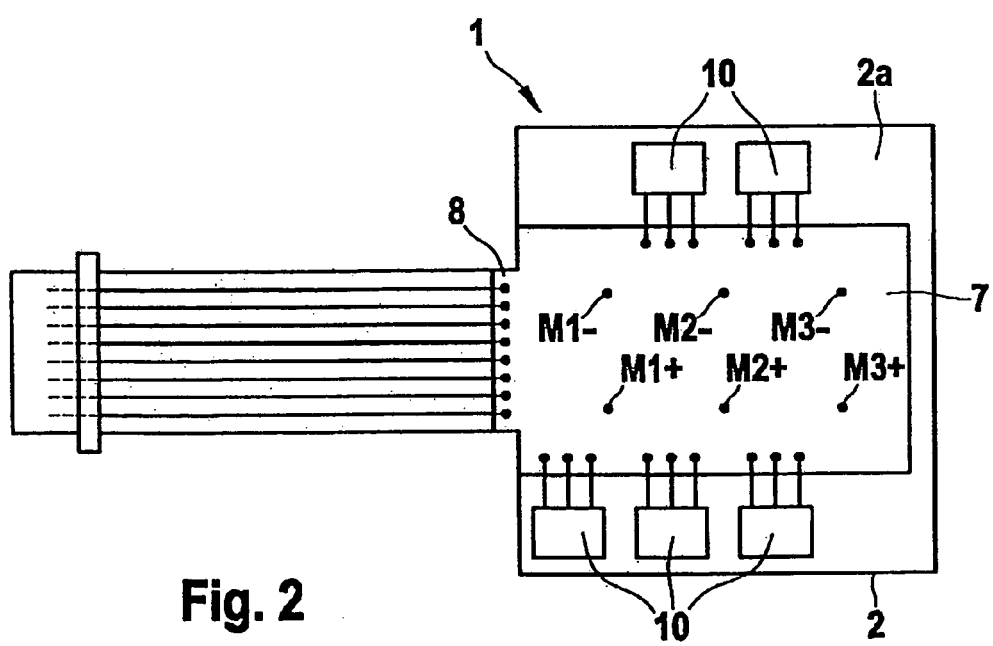
FIG. 2 is an overhead view of the pilot control unit from FIG. 1.
Figure 3:
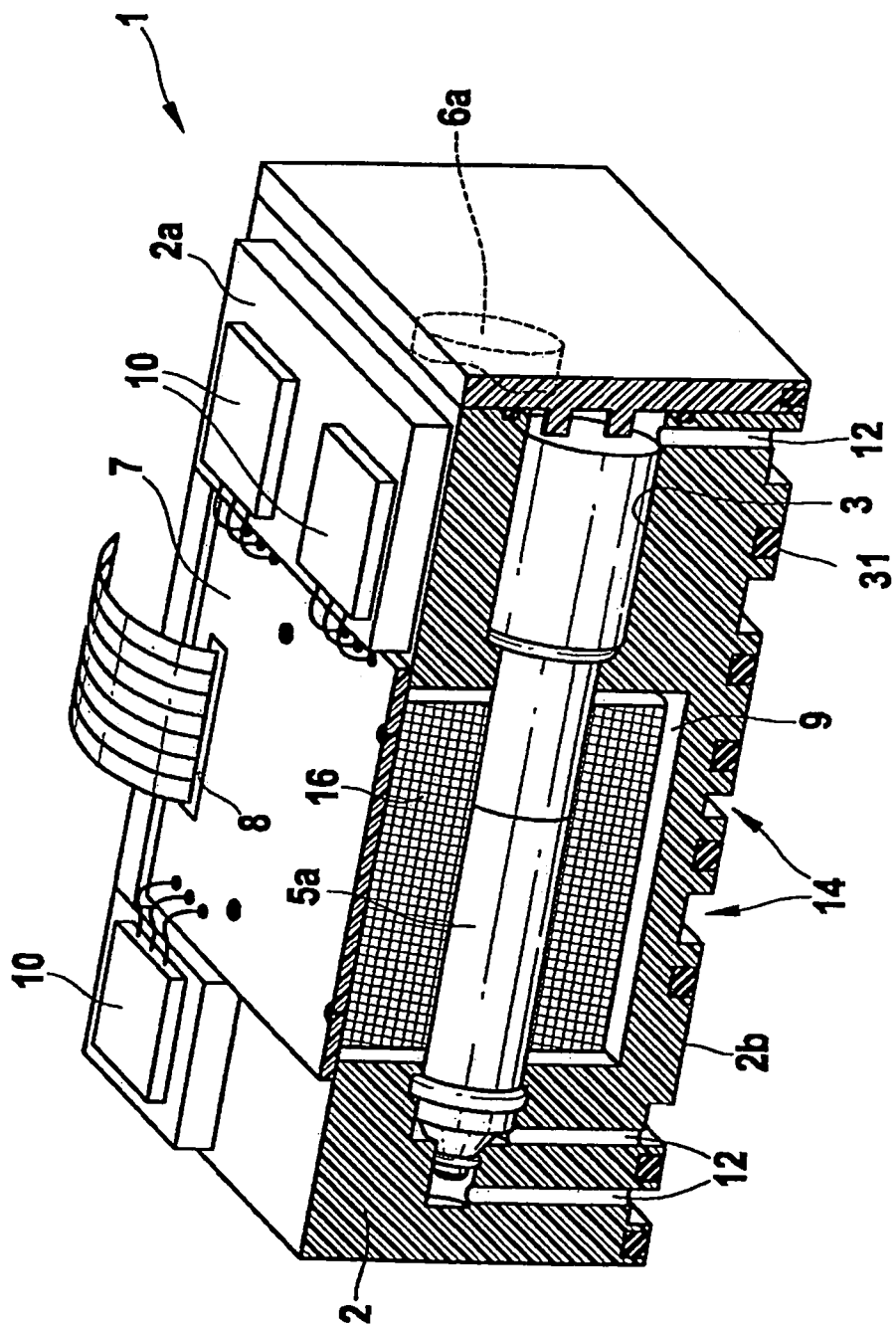
FIG. 3 shows the pilot control unit from FIGS. 1 and 2 in perspective cross section through a housed valve, without cutaway view of the valve cartridge.
Figure 4:
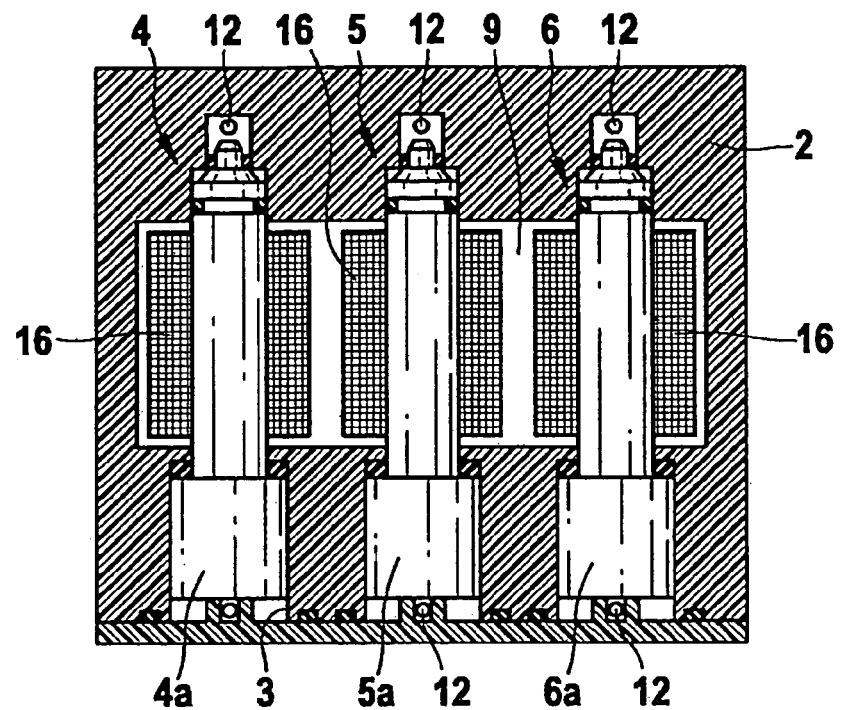
FIG. 4 shows a horizontal section through all valves of the pilot control unit.

Pilot control unit 1 is provided with a pilot control housing 2, preferably made of plastic, in which there are housed solenoid valves 4, 5, and 6. Bores 3, into which valve cartridges 4a, 5a, and 6a are introduced, run in transverse direction through pilot control housing 2. In the interior of pilot control housing 2 there is provided a free space, formed as a molded pocket 9, for solenoids 16, into which valve cartridges 4a, 5a, and 6a are introduced. A circuit substrate 7 (e.g., a printed circuit board) having electrical interface 8 (e.g., a plug) is mounted on top side 2a of pilot control housing 2. Solenoids 16 are fastened directly to printed circuit board 7 at contacts M1+, MI−, M2+, M2−, M3+, M3−. According to FIGS. 1 and 2, a ribbon cable can be connected to electrical interface 8.

On top side 2a there are further mounted pressure sensors 10. Pressure sensors 10 can b; for example, micro-structured chip sensors (DIE sensors) having a sensor chip on a chip substrate, such as a ceramic hybrid. On bottom side 2b of pilot control housing 2 there is formed pneumatic interface 14 of pilot control unit 1, from which interface air ducts 12 run to pressure sensors 10 and to solenoid valves 4, 5, and 6. Pneumatic interface 14 is simply pressed against relay valve 18 to form a sealing labyrinth; for this purpose, seals 31 are provided at pneumatic interface 14.

Pressure sensors 10 can be fastened directly, that is, without chip substrate, to top side 2a of pilot control housing 2 and contacted with printed circuit board 7 by bond connections.

Depending on the application, different valves can be used as the solenoid valves. For example, a 3/2-way valve as redundancy valve 5, which in its de-energized condition (redundancy case) permits pneumatic gating control of the brake-force transducer of the driver, and in its energized condition permits electro-pneumatic EBS control, can be included.

Furthermore, in a simple case, there can be provided a 2/2-way valve as air admission valve 4 and a further 2/2-way valve as vent valve 6. According to a preferred embodiment, two-stage solenoid valves 4 and 6 of the type known in principle from DE 10 2004 035 763 A1 are provided for this purpose. Thus, solenoid valves 4 and 6 each has a 2/2-way primary valve on the primary side and a 3/2-way valve on the secondary side. The primary armature and secondary armature can be guided in a common armature guide tube and controlled by a common solenoid system having two current levels. In the de-energized condition, the primary valve is open and the secondary valve is in its air admission position, thus permitting admission of air or supply of control pressure. At a first, lower current intensity, the primary valve closes without change of the secondary valve, so that the pressure is held in the downstream pneumatic cylinder. At the second, higher current intensity, the secondary valve is displaced (while the primary valve remains shut off without change) such that venting can take place via the secondary valve.

Valves 4, 5, and 6 are in communication with pneumatic interface 14 via air ducts 12 formed internally in pilot control housing 2.

According to some embodiments, no electrical control device is provided on this pilot control unit 1. Control can be exercised via electrical interface 8.

Alternatively, however, printed circuit board 7 can also be equipped with the control device, such as a microprocessor and/or further electronic components of a regulator.

Figure 5:
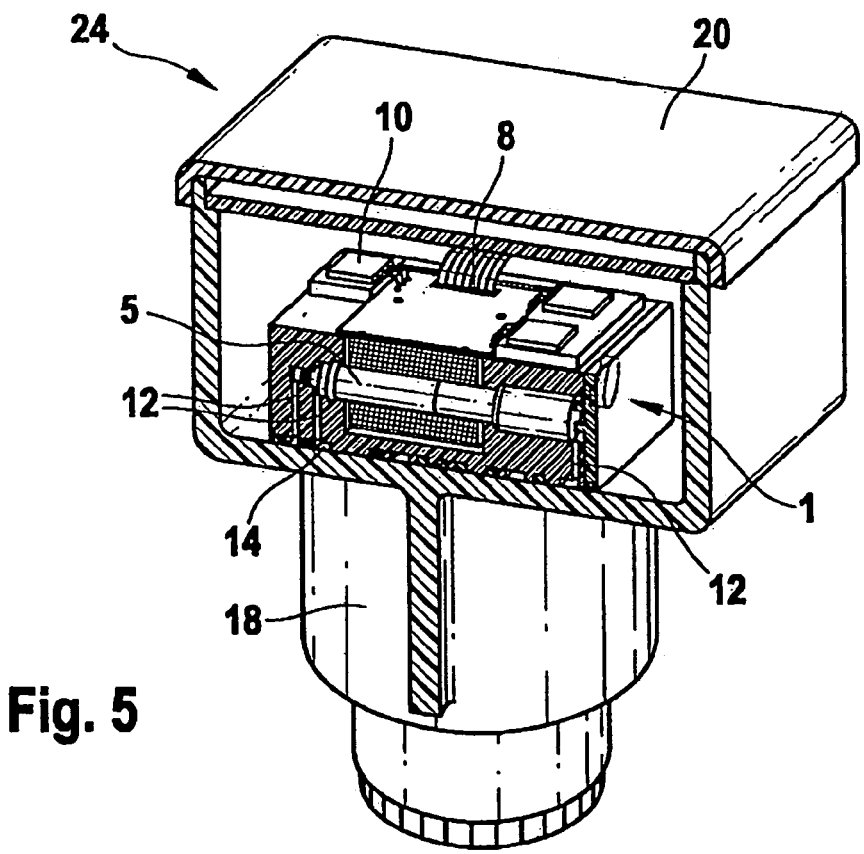
FIG. 5 shows how the pilot control unit is installed in the complete pressure modulator.

FIG. 5 shows pilot control unit 1 together with its pneumatic interface 14 forming a sealing labyrinth with air-flow-boosting relay valve 18. An electrical component 20 is placed on top of pilot valve unit 1 and contacted with electrical interface 8, thus forming pressure modulator 24.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A valve control unit for a pressure modulator of a commercial vehicle, the valve control unit comprising:
   a valve control housing;
   a plurality of solenoid valves housed in the valve control housing, each solenoid valve comprising a solenoid and valve internals, the solenoids being insertable in a first direction via a recess in a top side of the valve control housing and the valve internals being insertable into the solenoids in a second direction, perpendicular to the first direction, via valve bores disposed in the valve control housing;

a pneumatic interface configured to couple directly to a relay valve;

pressure sensors for measuring pneumatic pressures housed in one of in and on the valve control unit;

air ducts disposed in the valve control housing between the pneumatic interface, the valve bores, and the pressure sensors; and an electrical interface in contact with the pressure sensors and the solenoids.

2. The valve control unit according to claim 1, wherein the valve control housing is formed in one piece.

3. The valve control unit according claim 2, wherein the valve control housing is formed from plastic.

4. The valve control unit according to claim 3, wherein the plastic valve control housing is manufactured using an injection-molding process.

5. The valve control unit according to claim 1, wherein at least two of the solenoid valves are two-stage solenoid valves with two armatures housed in a common solenoid system, and wherein the solenoid system is operable when de-energized and also when energized with a first lower current intensity and a second higher current intensity.

6. The valve control unit according to claim 1, wherein the pressure sensors are sensor chips, and are mounted and contacted on a top side of the valve control housing.

7. The valve control unit according to claim 6, further comprising a circuit substrate mounted to the top side, coupled to the pressure sensors, the solenoids, and the electrical interface.

8. The valve control unit according to claim 7, wherein the electrical interface is formed only on the top side of the valve control housing, one of with and on at least one of:
   a printed circuit board;
   a flexible film; and
   a stamped grid.

9. The valve control unit according to claim 7 wherein the circuit substrate further comprises at least one of:
   a control device for electrical control of the solenoid valves; and
   components of a regulating electronic unit.

10. The valve control unit according to claim 6, wherein the sensor chips are sensor hybrids.

11. The valve control unit according to claim 1, wherein the valve control unit is connected to an external electronic control device via the electrical interface.

12. The valve control unit according to claim 1, wherein the pneumatic interface is disposed a bottom side of the valve control housing, opposite the top side, and the air ducts are disposed in the valve control housing and extend from the pneumatic interface to the pressure sensors.

13. The valve control unit according to claim 1, wherein the pneumatic interface one of contains and forms a labyrinth seal.

14. The valve control unit according to claim 1, wherein the pneumatic interface is provided with a plurality of pneumatic connections between pneumatic lines.

15. The valve control unit according to claim 1, wherein the solenoids are disposed in a middle free space of the valve control housing and through which there extend the valve bores containing the valve internals.

16. The valve control unit according to claim 15, wherein the valve internals of a solenoid valve are each formed as a valve cartridge that is insertable in one piece.

17. The valve control unit according to claim 16, wherein the inserted valve cartridges fix the solenoids in the middle free space.

18. The valve control unit according to claim 1, wherein the pneumatic interface is disposed on an air-flow-boosting valve and is fastened sealingly by a pressing force.

19. The valve control unit according to claim 1, wherein the plurality of solenoid valves include at least one of:
   at least one redundancy valve operable to change over between pneumatic redundancy operation and electropneumatic control; and
   at least two solenoid valves for air admission and venting.

20. The valve control unit according to claim 1, wherein the valve control unit is a brake pressure pilot control unit for an electropneumatic brake system of one of a:
   commercial vehicle;
   a pilot control unit of a pneumatic level regulator; and
   a traction regulator of a commercial vehicle.

21. A pressure modulator comprising:
   a pilot control unit according to claim 20;
   a relay valve disposed sealingly on the pneumatic interface; and
   an electronic device comprising a control device, and coupled to the electrical interface of the pilot control unit.

* * * * *

UNITED STATES PATENT AND TRADEMARK OFFICE
CERTIFICATE OF CORRECTION

PATENT NO. : 8,434,520 B2  Page 1 of 1
APPLICATION NO. : 12/310947
DATED : May 7, 2013
INVENTOR(S) : Frank et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this
Eighth Day of September, 2015

Michelle K. Lee
*Director of the United States Patent and Trademark Office*